United States Patent
Lin et al.

(10) Patent No.: US 8,751,708 B2
(45) Date of Patent: Jun. 10, 2014

(54) METHOD FOR TRANSMITTING TOUCH PANEL DATA

(75) Inventors: Ming-Chuan Lin, Taichung (TW); Lin Lin, Taichung (TW); Chih-Chiang Lin, Taichung (TW); Hsuan-Kuang Chen, Taichung (TW)

(73) Assignees: Dongguan Masstop Liquid Crystal Display Co., Ltd., Guangdong Province (CN); Wintek Corporation, Taichung (TW)

( * ) Notice: Subject to any disclaimer, the term of this patent is extended or adjusted under 35 U.S.C. 154(b) by 578 days.

(21) Appl. No.: 13/050,944

(22) Filed: Mar. 18, 2011

(65) Prior Publication Data

US 2012/0081301 A1  Apr. 5, 2012

(30) Foreign Application Priority Data

Sep. 30, 2010  (TW) ................ 99133387 A

(51) Int. Cl.
*G06F 3/01* (2006.01)
(52) U.S. Cl.
USPC ............................ 710/68; 710/34
(58) Field of Classification Search
None
See application file for complete search history.

(56) References Cited

U.S. PATENT DOCUMENTS

| | | | |
|---|---|---|---|
| 5,621,437 A * | 4/1997 | Jeong | 345/173 |
| 5,850,526 A * | 12/1998 | Chou | 709/247 |
| 6,538,675 B2 * | 3/2003 | Aratani et al. | 715/856 |
| 7,176,904 B2 * | 2/2007 | Satoh | 345/173 |
| 7,359,376 B1 * | 4/2008 | Horlander et al. | 370/366 |
| 7,801,969 B2 * | 9/2010 | Nakajima et al. | 709/217 |
| 8,139,045 B2 * | 3/2012 | Jang et al. | 345/175 |
| 8,269,740 B2 * | 9/2012 | Sohn et al. | 345/173 |
| 2008/0192928 A1 | 8/2008 | Yu et al. | |
| 2008/0211766 A1 * | 9/2008 | Westerman et al. | 345/156 |
| 2008/0309624 A1 * | 12/2008 | Hotelling | 345/173 |

FOREIGN PATENT DOCUMENTS

| | | |
|---|---|---|
| CN | 101324824 | 12/2008 |
| CN | 101661368 | 3/2010 |
| CN | 101739212 | 6/2010 |
| TW | 200709073 | 3/2007 |
| TW | 200730381 | 8/2007 |
| TW | 201023654 | 6/2010 |
| TW | 201028856 | 8/2010 |

OTHER PUBLICATIONS

"Office Action of China Counterpart Application", issued on Oct. 29, 2013, p. 1-p. 6.
"Office Action of Taiwan Counterpart Application", issued on Dec. 6, 2013, pp. 1-5.

* cited by examiner

*Primary Examiner* — Cheng-Yuan Tseng
(74) *Attorney, Agent, or Firm* — Jianq Chyun IP Office

(57) ABSTRACT

A method for transmitting touch panel data is provided. The method is adapted for transmitting coordinate data of at least a touch point being touched on the touch panel and includes the following procedures. The at least coordinate data is compressed. A serial data transmission interface command and a serial data transmission interface client address are appended in front of the compressed at least coordinate data, such that the compressed at least coordinate data is encapsulated into a serial transmission data packet. In addition, the serial transmission data packet is transmitted through a serial data transmission channel.

8 Claims, 6 Drawing Sheets

METHOD FOR TRANSMITTING TOUCH PANEL DATA

CROSS-REFERENCE TO RELATED APPLICATION

This application claims the priority benefit of Taiwan application serial no. 99133387, filed Sep. 30, 2010. The entirety of the above-mentioned patent application is hereby incorporated by reference herein and made a part of this specification.

BACKGROUND

1. Field of the Invention

The invention relates to a method for transmitting touch panel data, and particularly, relates to a method for transmitting touch panel data capable of improving transmission efficiency of coordinate data of a multi-touch panel.

2. Description of Related Art

Operation application of a touch panel is developed towards a trend of multi-touch, which represents that a number of touch points supported by a control unit is increased, even increased by dozens to support operations of multiple users on a same touch panel. However, regarding a serial data transmission method used by the current touch panel, when a large amount of touch coordinate data is transmitted to an operating system of the touch panel device, the amount of the touch coordinate data is increased by multiple times, a communication time is correspondingly increased, so that operation performance of the touch panel device is decreased.

Moreover, since touch coordinate data transmission methods of the touch panels used by various manufactures apply different packet formats, developing time and labour cost for integrating the touch panel to an electronic device are increased. Therefore, it is an important issue to use a standardized packet format and a standardized communication protocol for transmitting touch coordinate data, so as to improve transmission efficiency of the coordinate data of the multi-touch panel.

SUMMARY OF THE INVENTION

The invention is directed to a method for transmitting touch panel data, which can improve transmission efficiency of multi-touch coordinate data, and a standardized packet format and communication protocol can be used to reduce developing time and cost thereof.

According to an embodiment of the invention, a method for transmitting touch panel data is proposed, which is adapted for transmitting coordinate data of at least one touch point being touched on a touch panel, and includes the following procedures. Coordinate data is compressed. A serial data transmission interface command and a serial data transmission interface client address are appended in front of the compressed at least one coordinate data, such that the compressed coordinate data is encapsulated into a serial transmission data packet. In addition, the serial transmission data packet is transmitted through a serial data transmission channel.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
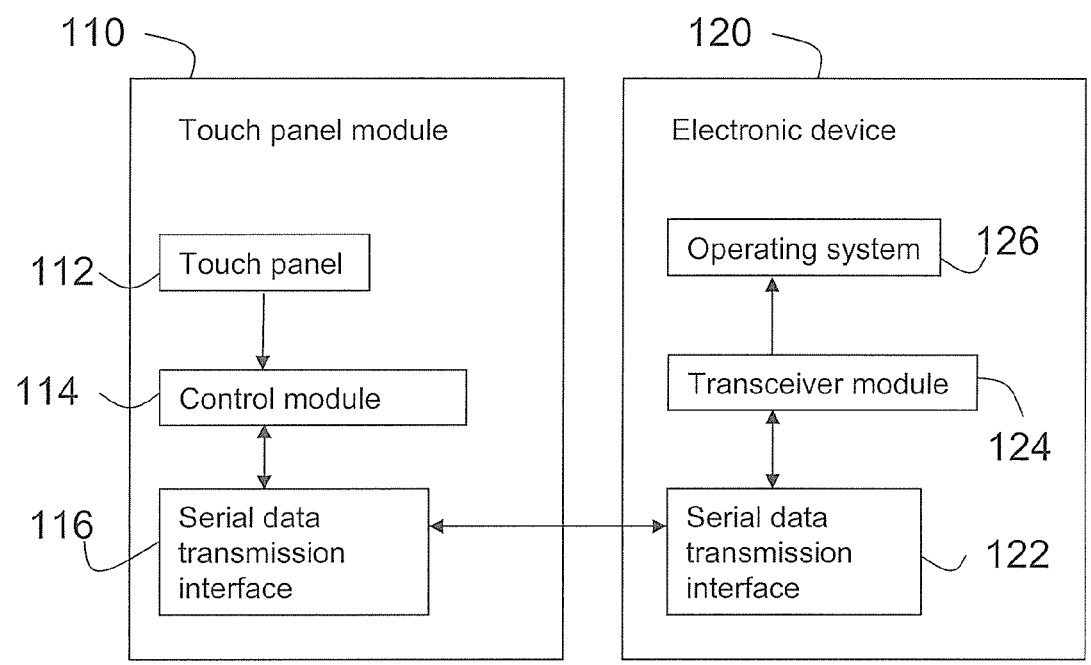
FIG. 1 is a schematic diagram illustrating a touch panel module and an electronic device according to an embodiment of the invention.

FIG. 1 is a schematic diagram illustrating a touch panel module 110 and an electronic device 120 according to an embodiment of the invention. Referring to FIG. 1, the touch panel module 110 at least includes a touch panel 112, a control module 114 and a serial data transmission interface 116. The electronic device 120 at least includes a serial data transmission interface 122, a transceiver module 124 and an operating system 126. The operating system 126 is stored in a memory module (not shown) of the electronic device 120, and is executed by a processor module (not shown) of the electronic device 120. The electronic device 120 is, for example, a computer, a mobile phone, a smart phone, a notebook computer, a television, a display screen or a display device, etc. The invention is not limited thereto, and in other embodiments, the touch panel module 110 and the electronic device 120 can be integrated into one device.

Referring to FIG. 1, the touch panel 112 is configured for detecting touch operation of a user, and the touch operation is, for example, a finger touch. The control module 114 is coupled to the touch panel 112 for receiving real coordinates from the touch panel 112, and determining whether or not to compress coordinate data of the true coordinates. The control module 114 further encapsulates the coordinate data or the compressed coordinate data into a serial transmission data packet. The control module 114 may include a processor (or a control chip) and may include a compression encoder chip or a software program, a firmware program or command which is used for determining whether the coordinate data is greater than a predetermined threshold.

By using the processor or the compression encoder chip to compress multi-touch coordinate data, a transmission efficiency of the multi-touch coordinate data within a fixed transmission time can be greatly improved. A data compression method supported by the control module 114 is, for example, a minimum redundancy coding method, a Shannon-Fano algorithm, or a Huffman algorithm. However the invention is not limited thereto, and in other embodiments, other data compression algorithms and dictionary methods (for example, a LZ77 algorithm) can be used to compress the coordinate data.

The serial data transmission interface 116 of the touch panel module 110 is connected to the serial data transmission interface 122 through a serial data transmission channel (or a serial data transmission bus) of the electronic device 120.

The serial data transmission interface is, for example, an inter-integrated circuit (referred to as an I2C data transmission interface), a four-wire serial bus interface (referred to as a SPI data transmission interface) or a universal serial bus (USB) interface. The control module 114 encapsulates the compressed coordinate data or the uncompressed original coordinate data into a serial transmission data packet, and a format of the serial transmission data packet is introduced in accordance with Table I and Table II shown below.

TABLE I

| Serial data transmission interface client address | Serial data transmission interface command | Compressed coordinate data |
| --- | --- | --- |

TABLE II

| Serial data transmission interface client address | Serial data transmission interface command | Uncompressed original coordinate data |
| --- | --- | --- |

As shown in the Table I, after the control module 114 has completed compressing the coordinate data, the compressed coordinate data is encapsulated (or integrated) into a serial transmission data packet. Such serial transmission data packet is a first type serial transmission data packet, and the serial data transmission interface client address thereof is, for example, 3 bytes, and each compressed coordinate data is, for example, 6 bytes. The compressed coordinate data is a plurality of coordinate data detected by the touch panel module 110 at a same time. For example, the user's 10 fingers touch the touch panel 112 at the same time to generate coordinate data of 10 touch points, and the control module 114 determines these coordinate data. After theses 10 coordinate data are determined to be compressed, the control module 114 appends the serial data transmission interface client address and the serial data transmission interface command in front of the compressed coordinate data, so as to produce the first type serial transmission data packet.

When the control module 114 does not compress the coordinate data, a format of the transmitted data is a second type serial transmission data packet shown in the Table II, and each of the uncompressed coordinate data is, for example, 10 bytes. However the invention is not limited thereto, and the serial transmission data packet may further include a parity check code to ensure correctness of the packet during the transmission.

The transceiver module 124 of the electronic device 120 is coupled to the control module 114 through the serial data transmission interface 116 and the serial data transmission interface 122 for receiving the coordinate data, decompresses the compressed coordinate data to obtain usable coordinate data, and provides a positive acknowledgement (ACK) or a negative ACK (NACK) to the control module 114, so as to implement a packet retransmission mechanism. The transceiver module 124 may include a processor (or a control chip), and may include a processor chip, a decompression chip, a decoder chip, and a software program, a firmware program or command which is used for determining whether the serial transmission data packet is correct. Moreover, the transceiver module 124 is coupled to the operating system 126, and provides the usable coordinate data to the operating system 126, and the coordinate data is suitably processed by the operating system 126 or an application program (not shown) being operated in the operating system 126.

Figure 2:
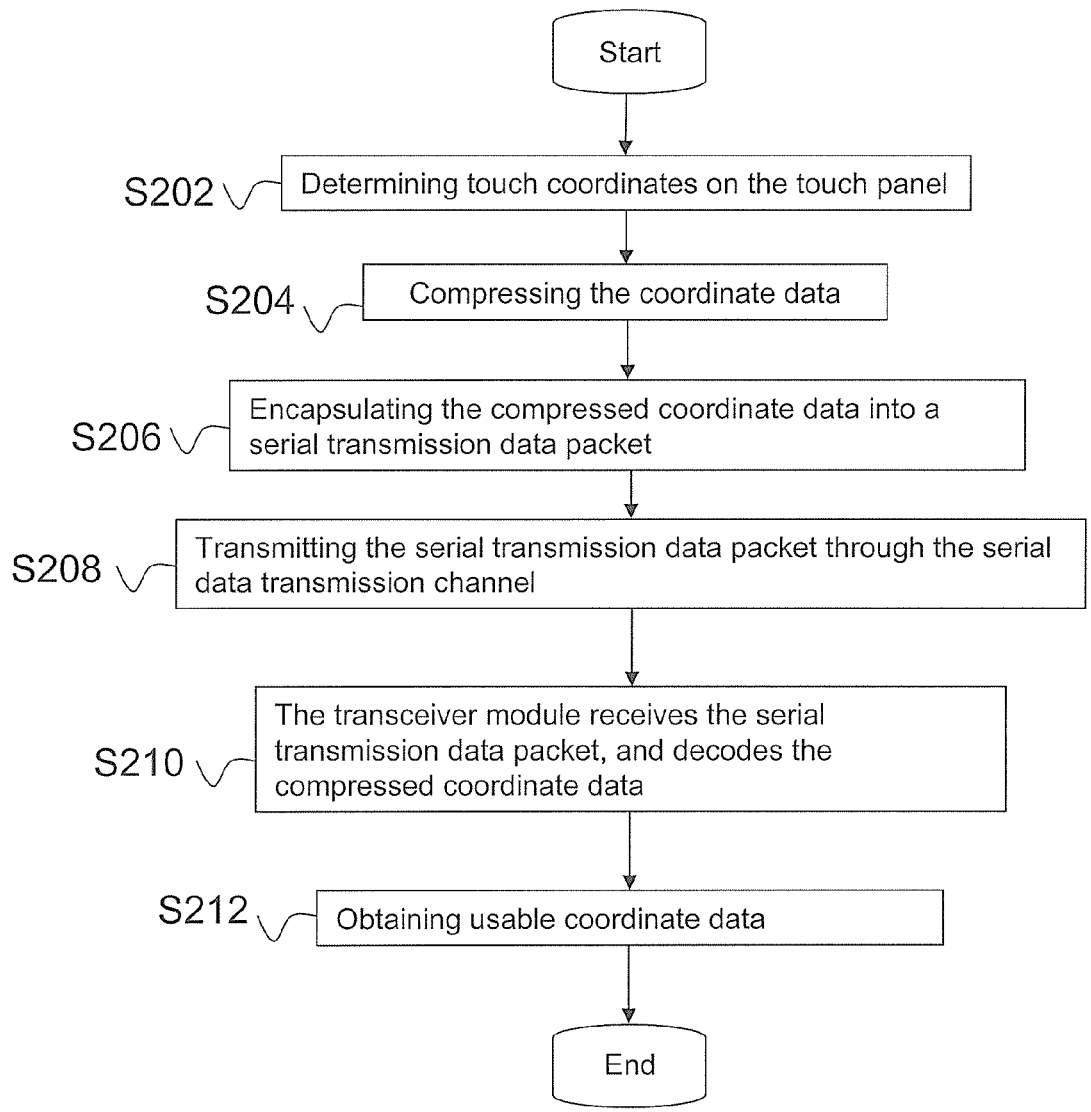
FIG. 2 is a flowchart illustrating a method for transmitting touch panel data according to an embodiment of the invention.

FIG. 2 is a flowchart illustrating a method 200 for transmitting touch panel data according to an embodiment of the invention. Referring to FIG. 1 and FIG. 2, the method 200 for transmitting touch panel data roughly includes following steps. The control module 114 determines touch coordinates on the touch panel 112 (step S202). The control module 114 compresses the coordinate data (step S204). The control module 114 encapsulates the compressed coordinate data into a serial transmission data packet (step S206). The control module 114 transmits the serial transmission data packet through the serial data transmission channel (step S208). The transceiver module 124 receives the serial transmission data packet, and decodes the compressed coordinate data (step S210), and obtains usable coordinate data (step S212). The compressed data packet is the serial transmission data packet shown in Table I.

Figure 3:
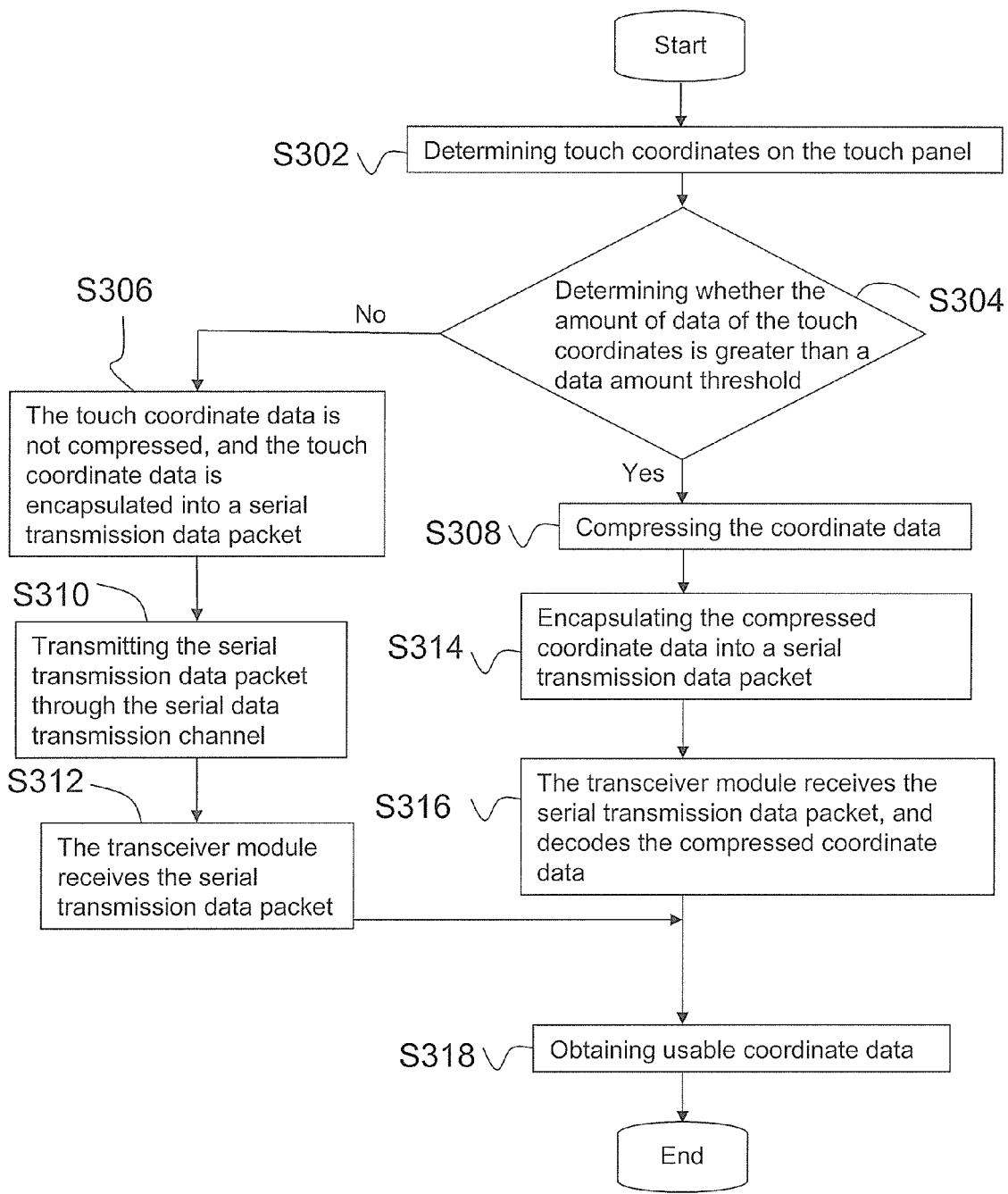
FIG. 3 is a flowchart illustrating a method for transmitting touch panel data according to another embodiment of the invention.

FIG. 3 is a flowchart illustrating a method 300 for transmitting touch panel data according to another embodiment of the invention. Referring to FIG. 1 and FIG. 3, the method 300 for transmitting touch panel data is similar to the method 200 for transmitting touch panel data, though a step of determining whether or not to compress the coordinate data is added. Therefore, when an amount of the coordinate data is relatively less, i.e., an amount of the coordinates being touched is relatively less, the control module 114 can transmit the coordinate data in an energy efficient approach. The uncompressed data packet is the serial transmission data packet shown in Table II.

The method 300 for transmitting touch panel data includes following steps. Started by a step S302, the control module 114 determines touch coordinates on the touch panel 112 (step S302). The control module 114 determines whether an amount of data of the touch coordinates is greater than a data amount threshold (step S304), and the data amount threshold is, for example, 30 bytes. If the amount of data of the touch coordinates is smaller than the data amount threshold, a step S306 is executed after the step S304, i.e., the control module 114 does not compress the touch coordinate data, and encapsulates the touch coordinate data into a serial transmission data packet (the serial transmission data packet shown in Table II). The control module 114 transmits the serial transmission data packet having the uncompressed touch coordinate data through the serial data transmission channel (step S310). The transceiver module 124 receives the serial transmission data packet (step S312), and obtains usable coordinate data (step S318). After the step S318, the method 300 for transmitting touch panel data is ended.

If the amount of data of the touch coordinates is greater than the data amount threshold, after the step S304, the steps S308, S314, S316 and S318 are executed, and the above steps are identical to the steps S204, S206, S208 and S210 of FIG. 1, so that detailed descriptions thereof are not repeated.

Figure 4:
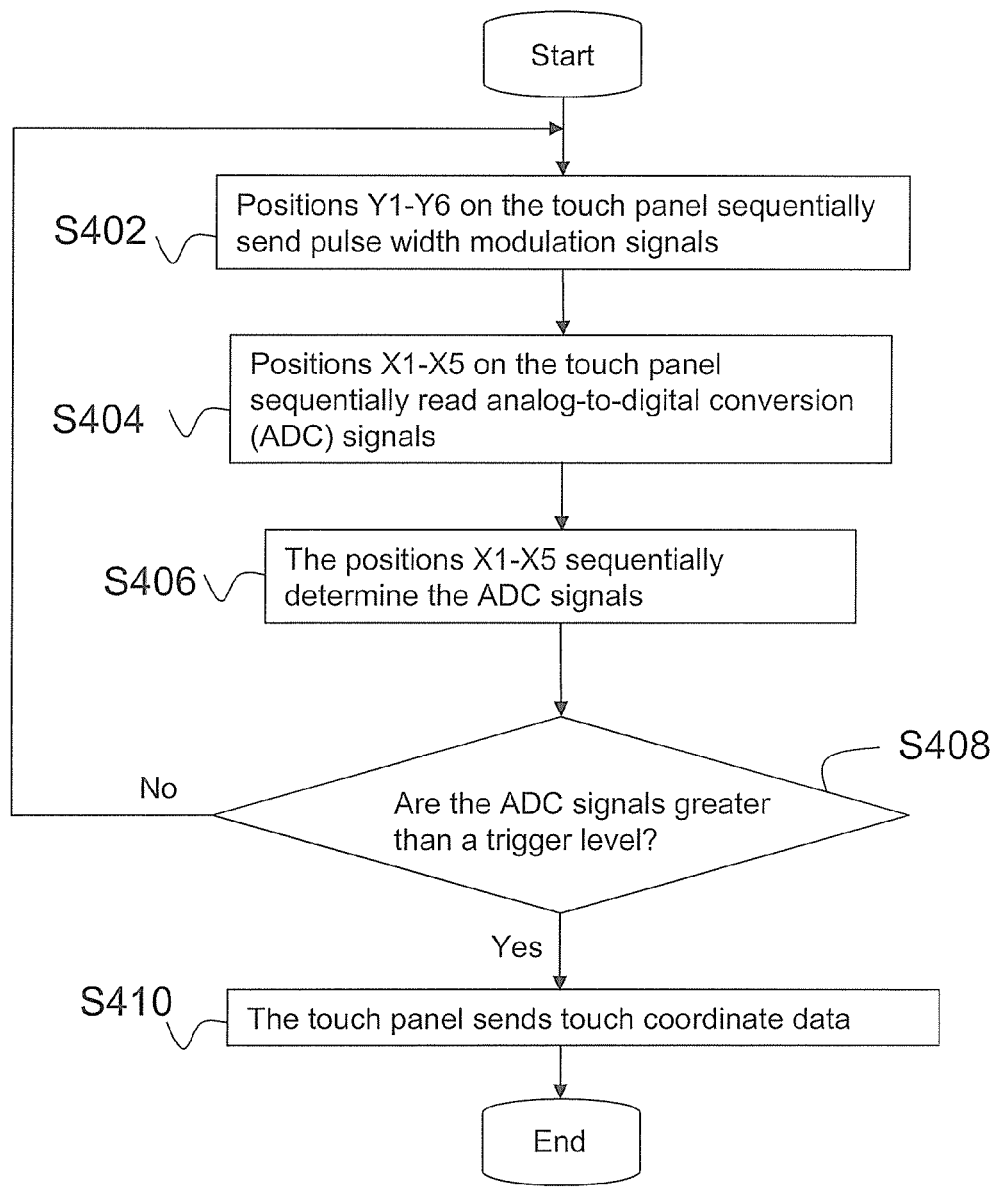
FIG. 4 is a flowchart illustrating a method for determining touch coordinate data according to an embodiment of the invention.

FIG. 4 is a detailed flowchart illustrating a method 400 for determining touch coordinate data corresponding to the step S202 of FIG. 2 and the step S302 of FIG. 3 according to an embodiment of the invention. Referring to FIG. 1 to FIG. 4, it is assumed that the touch panel 112 has a resolution of 5×6. The method 400 for determining touch panel data includes following steps. Positions Y1-Y6 (positions along a vertical axis direction) on the touch panel 112 sequentially send pulse width modulation signals (step S402). Positions X1-X5 (positions along a horizontal axis direction) on the touch panel 112 sequentially read analog-to-digital conversion (ADC) signals (step S404). The positions X1-X5 on the touch panel 112 sequentially determine the ADC signals (step S406), and the touch panel 112 determines whether the current ADC signal is greater than a trigger level (step S408). If the current ADC signal is greater than the trigger level, the touch panel 112 sends the currently corresponding touch coordinate data (S410), and the method 400 for determining touch panel data is ended. Conversely, if the current ADC signal is less than the trigger level, the method 400 returns to execute the step S402, and the touch panel 112 re-obtains ADC signal of a new cycle, where the cycle is, for example, 0.6 ms.

Figure 5:
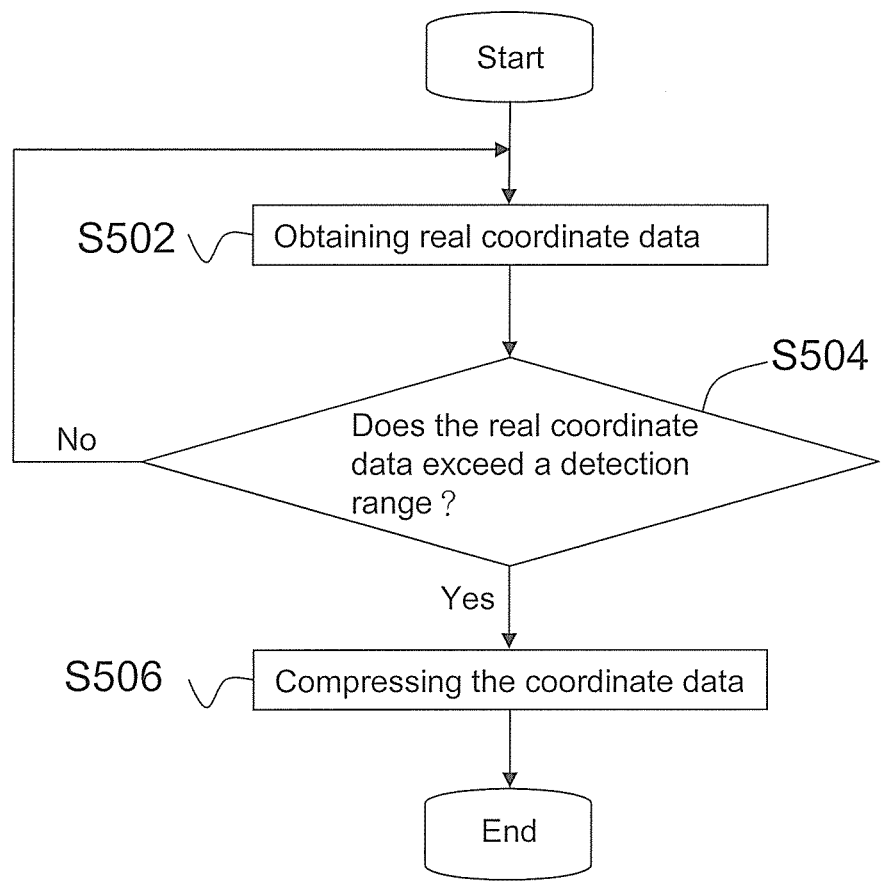
FIG. 5 is a flowchart illustrating a method for compressing coordinate data according to an embodiment of the invention.

FIG. 5 is a detailed flowchart illustrating a method 500 for compressing coordinate data corresponding to the step S204 of FIG. 2 and the step S308 of FIG. 3 according to an embodiment of the invention. Referring to FIG. 1 to FIG. 5, the method 500 includes following steps. The control module 114 obtains real coordinate data (Step S502), and the real coordinate data is the at least one touch coordinate data sent by the touch panel 112 in the step S410. Then, the control module 114 determines whether the real coordinate data exceeds a detection range (step S504), where the detection range is the resolution of the touch panel 112. If the real coordinate data does not exceed the detection range, the control module 114 continues to execute the step of compressing the coordinate data (step S506), and the method 500 for compressing coordinate data is ended. Conversely, if the real coordinate data exceeds the detection range, the touch panel 112 determines that such coordinate data as an error, and the method 50 returns to execute the step S502 for re-obtaining the coordinate data of a new cycle.

For example, it is assumed that the touch panel 112 has a resolution of 5×6, though the received coordinates data is (8, 10), which obviously exceeds a range of a predetermined touch area of the touch panel 112, so that the control module 114 can determine the received coordinate data as an error. Since the touch panel 112 is liable to be influenced by other electronic devices, processing and transmitting of an erroneous coordinate data can be avoided by executing the method 500 for compressing coordinate data, so as to improve data transmission efficiency.

Figure 6:
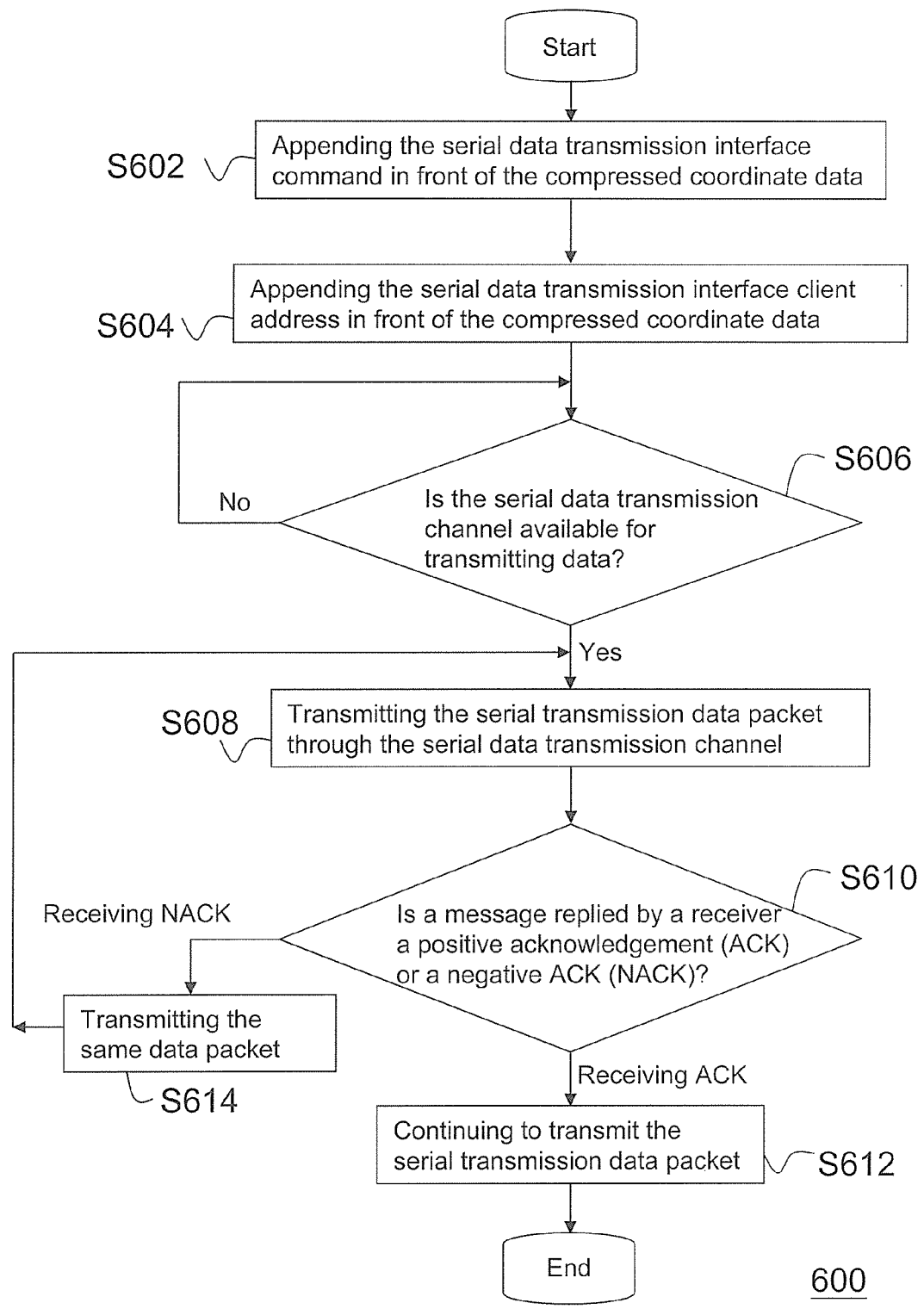
FIG. 6 is a flowchart illustrating a method for transmitting a serial transmission data packet according to an embodiment of the invention.

FIG. 6 is a detailed flowchart illustrating a method 600 for transmitting serial transmission data packets corresponding to the steps S206 and S208 of FIG. 2 and the steps S314 and S316 of FIG. 3 according to an embodiment of the invention. Referring to FIG. 1 to FIG. 6, the method 600 includes following steps. The control module 114 appends the serial data transmission interface command in front of the compressed coordinate data (step S602), appends the serial data transmission interface client address in front of the compressed coordinate data (step S604), and determines whether the serial data transmission channel is available for transmitting data (step S606).

Since the serial data transmission channel is shared by the electronic device 120 or a plurality of modules (for example, an audio module, a power management module or a communication protocol processing module) connected to the electronic device 120, it is not always in an idle state. Only when the control module 114 detects whether the serial data transmission channel is available for transmitting data, the control module 114 transmits the serial transmission data packet through the serial data transmission channel (step S608) and the control module 114 determines whether a message replied by a receiver is a positive acknowledgement (ACK) or a negative ACK (NACK) (step S610). When the control module 114 detects that the serial data transmission channel is not available for transmitting data, the control module 114 keeps waiting or continually detects whether the serial data transmission channel is available for transmitting data.

When the control module 114 receives the ACK in the step S610, the control muddle 114 continues to transmit the serial transmission data packet (step S612), and the method 600 for transmitting the serial transmission data packet is ended.

When the control module 114 receives the NACK in the step S610, a step S614 is executed after the step S610, in which the control module 114 retransmits the same serial transmission data packet, and the method 600 returns to execute the step S608.

A processing flow of the transceiver module 124 is roughly in a reversed order to that of the control module 114, for example, the transceiver module 124 checks whether the serial data transmission interface client address and the serial data transmission interface command in the received serial transmission data packet are correct, and detects whether the received, decoded or decompressed coordinate value exceeds the predetermined detection range. Since a decompression method is already known by those skilled in the art, detailed description thereof is not repeated.

In summary, according to the method for transmitting touch panel data of the invention, the coordinate data is compressed to reduce a data transmission amount and a transmission time, so as to improve data transmission efficiency of the touch panel. Based on a standardized serial transmission data packet format, developing time and cost can be reduced, and it can be expanded to touch panels of more touch points. Moreover, by determining whether the data amount or the number of coordinates of the coordinate data is greater than a predetermined threshold, it is determined whether the coordinate data is compressed, so as to achieve a power-saving effect when the amount of data transmission is relatively less.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for transmitting touch panel data, adapted for transmitting coordinate data of at least one touch point being touched on a touch panel, the method for transmitting touch panel data comprising:
 determining whether an amount of data of the coordinate data is greater than a data amount threshold;
 compressing the coordinate data when the amount of data of the coordinate data is greater than the data amount threshold;
 appending a serial data transmission interface command and a serial data transmission interface client address in front of the compressed coordinate data, such that the compressed coordinate data is encapsulated into a first serial transmission data packet;
 transmitting the first serial transmission data packet through a serial data transmission channel; and
 selecting not to compress the coordinate data when the amount of data of the coordinate data is less than the data amount threshold.

2. The method for transmitting touch panel data as claimed in claim 1, wherein when the coordinate data is not compressed, the method further comprises:
 appending the serial data transmission interface command and the serial data transmission interface client address in front of the coordinate data, such that the coordinate data is encapsulated into a second serial transmission data packet; and
 transmitting the second serial transmission data packet through the serial data transmission channel.

3. The method for transmitting touch panel data as claimed in claim 1, wherein before the step of compressing the at least one coordinate data, the method further comprises:

determining at least a touch coordinate on the touch panel, and outputting the coordinate data.

4. The method for transmitting touch panel data as claimed in claim 3, further comprising:
sequentially sending at least a pulse width modulation signal along a vertical axis of the touch panel;
sequentially reading at least a analog-to-digital conversion signal along a horizontal axis of the touch panel;
sequentially determining at least an analog-to-digital conversion signal along the horizontal axis of the touch panel;
determining whether the at least an analog-to-digital signal is greater than a trigger level, wherein,
the coordinate data is transmitted if the at least an analog-to-digital signal is greater then the trigger level; and
at least a pulse width modulation signal is sequentially transmitted along the vertical axis of the touch panel if the at least an analog-to-digital signal is less than the trigger level.

5. The method for transmitting touch panel data as claimed in claim 1, wherein the step of transmitting the serial transmission data packet comprises:
sequentially transmitting the serial data transmission interface client address, the serial data transmission interface command, and the compressed coordinate data.

6. The method for transmitting touch panel data as claimed in claim 1, wherein the step of transmitting the first serial transmission data packet comprises:

determining whether the serial data transmission channel is available for transmitting data, wherein,
the first serial transmission data packet is directly transmitted if the serial data transmission channel is available for transmitting data; and
the serial data transmission channel is continually detected if the serial data transmission channel is not available for transmitting data.

7. The method for transmitting touch panel data as claimed in claim 1, wherein the step of compressing the coordinate data comprises:
determining whether a value of the coordinate data exceeds a detection range, wherein the detection range is a resolution of the touch panel, wherein,
the coordinate data is compressed if the value of the coordinate data does not exceed the detection range; and
the coordinate data is abandoned if the value of the coordinate data exceeds the detection range.

8. The method for transmitting touch panel data as claimed in claim 1, wherein after the step of transmitting the first serial transmission data packet, the method further comprises:
determining whether a positive acknowledgement is received, and continually transmitting a next first serial transmission data packet when the positive acknowledgement is received; and
re-transmitting the current first serial transmission data packet when a negative acknowledgement is received.

* * * * *